Sept. 27, 1932.　　　L. H. COOLIDGE　　　1,879,659
REGULATOR FOR ADJUSTING THE PITCH TO PROPELLER BLADES WHILE IN MOTION
Filed June 17, 1929　　2 Sheets-Sheet 2
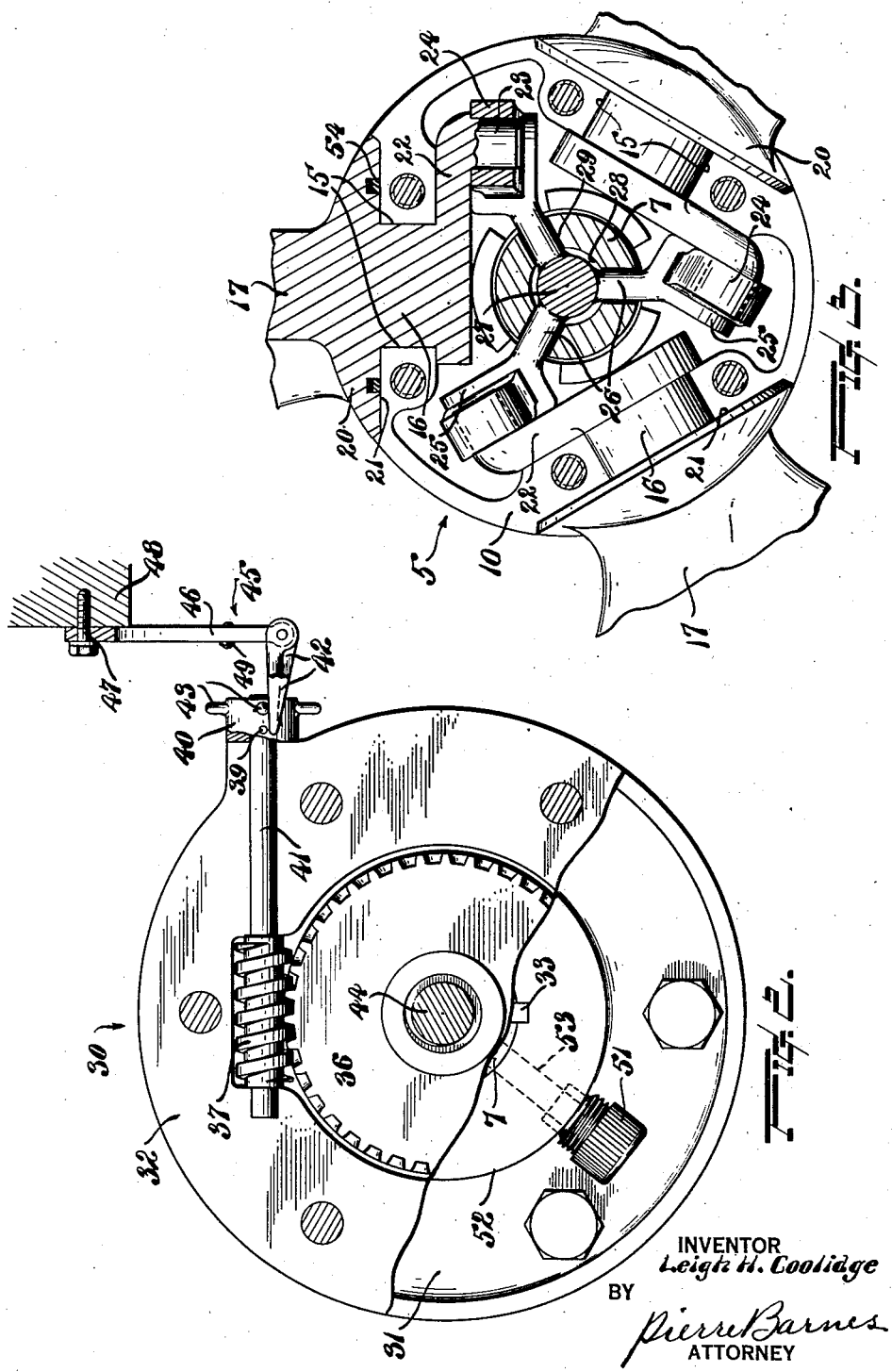
INVENTOR
Leigh H. Coolidge
BY
Pierre Barnes
ATTORNEY Patented Sept. 27, 1932

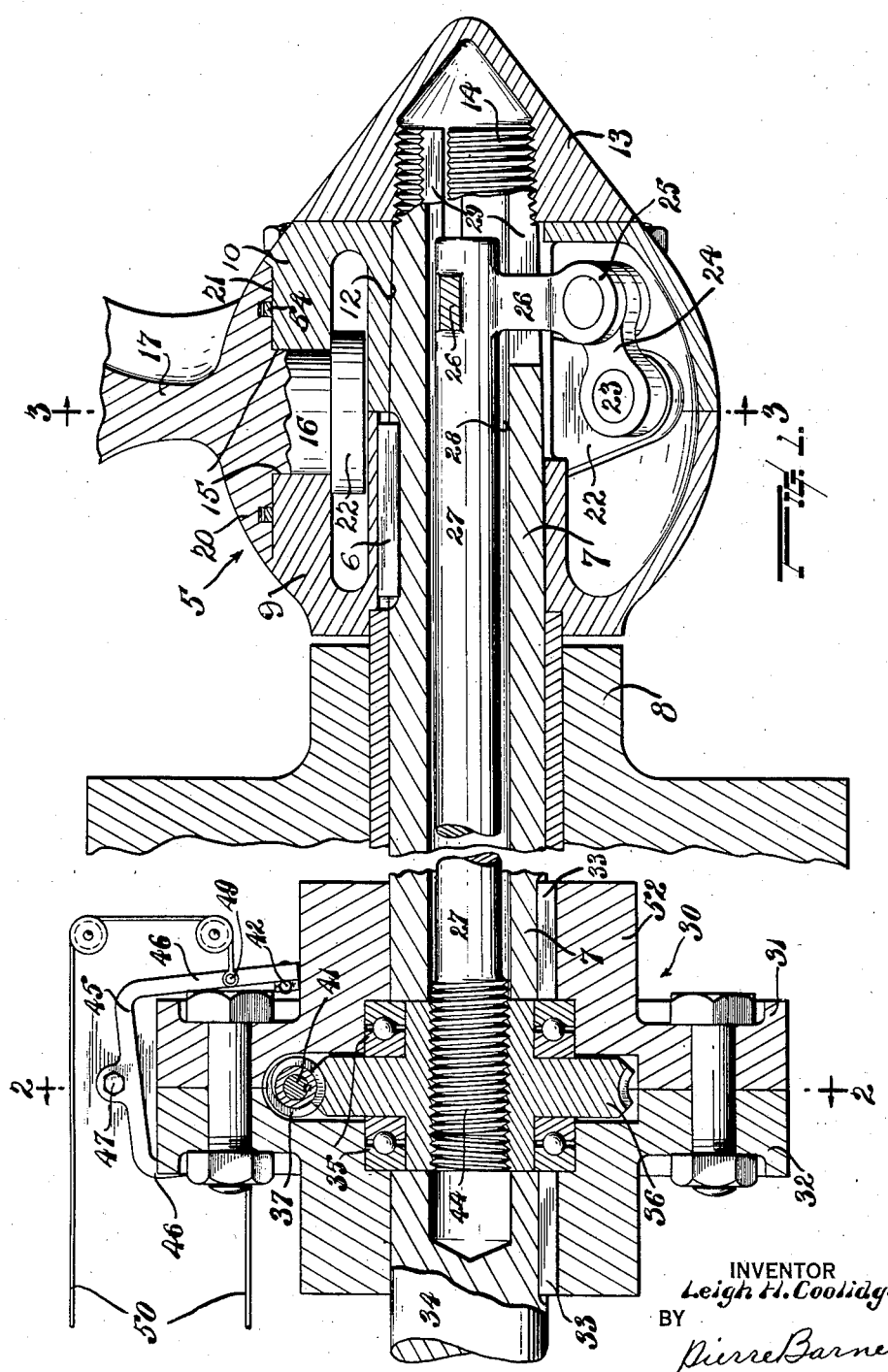

1,879,659

UNITED STATES PATENT OFFICE

LEIGH H. COOLIDGE, OF SEATTLE, WASHINGTON, ASSIGNOR TO COOLIDGE PROPELLER COMPANY, OF SEATTLE, WASHINGTON, A CORPORATION OF WASHINGTON

REGULATOR FOR ADJUSTING THE PITCH TO PROPELLER BLADES WHILE IN MOTION

Application filed June 17, 1929. Serial No. 371,464.

This invention relates to a regulator for adjusting the pitch to propeller blades, and more especially, to a device of this kind wherein adjustment is effected while the vessel and engines are in motion.

The invention has for an object the provision of means operatively attached to the root of the propeller blades whereby the pitch of the propeller blades can be advantageously controlled and regulated from a location convenient to the pilot house or engine room.

Another object of the invention is the provision, in the regulative apparatus thereof, of means whereby such pitch change is minimized to afford fractional adjustment thereto.

Still another object of the invention is the provision of means for containing a lubricant interiorly of the hub of said propeller blades and means for securing said lubricant against loss by joint leakage.

With the foregoing and other objects and advantages in view, the extent of which will become apparent, the invention consists in the novel construction, adaptation and combination of parts hereinafter described and claimed.

In the drawings, Figure 1 is a vertical longitudinal section of apparatus embodying my invention, parts being broken away. Fig. 2 is an end elevation of the controlling means used, with parts being shown in section, said section taken on the line 2—2 of Fig. 1; and Fig. 3 is a transverse vertical section through 3—3 of Fig. 1.

Reference being had thereto, the numeral 5 designates, generally, the propeller hub assembly, adaptably secured, as by a key 6, to a hollow driven tail shaft 7, mounted for rotation within the stern bearing 8 on a boat hull.

Said hub assembly is constructed, as shown, of a pair of associated elements, 9 and 10, arranged to be sleeved over the tapered portion 12 provided at the extremity of said tail shaft 7, and are secured thereto by the clamping nut 13 engaging the screw threaded extension 14 of said shaft. Mounted within bearings 15 provided in the opposing faces of said sleeved hub elements, I have secured, for variable pivotal rotation therein, the shanks 16 of a plurality, three being shown, of propeller blades 17, arranged to have their root elements 20 frictionally slidable over faced portions 21 of the respective sleeved members 9, 10.

Said shanks 16 have secured rigidly thereto, operative crank arms 22, and are provided, at the projecting extremities thereof, with trunnions 23. Links 24 engage said trunnions and are secured at their opposite ends in the forks 25 of respective radially projecting spider arms 26, said spider arms being rigidly secured to and axially movable with, a regulating shaft 27 carried for longitudinal movement within the bore 28 of said hollow tail shaft 7. Said spider arms project thru and are guidable longitudinally in, slots 29 of said tail shaft, restricting the movement thereof to secure the associated regulating shaft against a rotative movement independently of the revolving tail shaft.

The aforesaid structure is drawn to apparatus so constructed, interiorly of the hub assembly and secure from exterior forces thereabouts as to be readily accessible to regulative pitch changing thru means hereinafter described within the hull of the vessel, said means constituting the controlling medium and gauge for adjusting the pitch of the propeller blades.

Referring thereto, I provide, substantially intermediate said stern bearing 8 and a fore-bearing (not shown), a coupling 30 comprising a pair of complementary annular ring members 31, 32 secured, as by keys 33, to said driven shaft and an intermediate shaft 34. Disposed centrally of said coupling within a suitable aperture, I provide a worm wheel 36 mounted within ball bearing assemblies 35, said wheel being adapted for relative regulative activity in selective of rotary directions independently of the coupling, as by motivating a substantially tangentially disposed worm 37 meshing therewith. A shaft 41 of said worm projects through annular conjointly-secured members 31, 32, providing, adjacent the periphery thereof, a secured star wheel 40. As is believed evident, in providing means whereby horizontally disposed oppositely projecting fingers 43 of said star wheel may selectively be engaged in the revoluble activity of said coupling by contacting the fingers selectively with a rigid object, said worm may be afforded a substantial 90° activity at each revolution of travel. Reduction through worm wheel 36, and that afforded by the screw threaded engagement of a rearwardly projecting extension 44 of said regulating shaft 27 to the interior screw-threads of the worm wheel, accommodates a relatively minute longitudinal displacement of the shaft and the associated propeller-blade actuating spider arms.

As illustrated, the oppositely disposed fingers 43 are affected by contacting respective of a pair of rigid dogs 42, as desired. Said dogs as shown, are supported by depending arms 46 of a bifurcated bar member 45, fulcrumed as at 47 to a fixed beam 48 in a manner to pivot the same for activity in a plane at right angles to the axis of the star wheel, such pivotal movement being controlled by connections such as 49 and leads 50, which may be actuated from a pilot house or engine room of the vessel.

The disposition of the dogs, parallel to the star wheel axis and mounted as described, for pivotal movement in and out of the star wheel finger radii, will selectively engage either of the diametrically oppositely disposed horizontal fingers to motivate the star wheel in selective directional rotation. As is believed apparent, either or both dogs may be rendered inoperative.

In combination with the aforesaid mechanism, I provide lubricating means comprising a pressure grease cup 51 secured within the hub 52 of said annular member 31, and communicating through channel 53 with the bore 28 of the tail shaft 7, whence it is forced into contactual lubricative engagement with the operating mechanism of said coupling and propeller blade assembly. A spring pressed annular sealing ring 54 is inserted about the base of the propeller root 20, preventing lubrication loss thereabouts.

In adjusting the pitch of the propeller blades to that desired, the operator selectively moves either dog into engaging relation with rotating star wheel fingers, a revolution of the drive shaft imparting approximately a quarter turn, thru the star wheel, to the worm. As the worm wheel revolves, the regulating shaft, thru spider arms and link connections to the trunnions of arms 22, pivots said propeller blades about the axis of rotation of the shanks 16, to effect a pitch adjustment to the propeller blades.

While the invention has been illustrated and described, in the form now preferred, numerous changes in details of construction may be made within the scope of the appended claims.

What I claim is:—

1. In a regulator for adjusting the pitch of propeller blades, in combination, a propeller hub assembly adapted to be rigidly secured to a hollow tail shaft and consisting of associated demountable parts adapted to grip the shanks of propeller blade roots therebetween, a regulating shaft axially movable within the bore of said tail shaft, crank arms rigid with said propeller blade shanks, links pivoted thereto and having the opposite ends secured between the forks of spider arms integral with said regulating shaft, guide slots provided in said tail shaft for said spider arms, and means to actuate said regulating shaft axially of said tail shaft to effect pitch setting movement to said propeller blades, said means comprising a coupling rigid with said tail shaft, an interiorly screw-threaded worm wheel mounted therein and adapted to engage a threaded portion of said regulating shaft, a worm for said worm wheel and means operable by the revolution of said coupling to impart selected rotary direction to said worm.

2. In a regulator for adjusting the pitch of propeller blades, in combination, a propeller hub assembly adapted to be rigidly secured to a hollow tail shaft and consisting of associated demountable parts adapted to grip the shanks of propeller blade roots therebetween, a regulating shaft axially movable within the bore of said tail shaft, crank arms rigid with said propeller blade shanks, links pivoted thereto and having the opposite ends secured between the forks of spider arms integral with said regulating shaft, guide slots provided in said tail shaft for said spider arms, and means to actuate said regulating shaft axially of said tail shaft to effect pitch setting movement to said propeller blades.

3. In a regulator for adjusting the pitch of propeller blades, in combination, a propeller hub assembly adapted to be rigidly secured to a hollow tail shaft, means provided by said hub assembly to grip the shank of a propeller blade therein, a crank arm adapted to impart pivotal movement to said shank, a regulating shaft carried within the bore of said tail shaft and having operative connection with said crank arm, and means provided interiorly of the hull of a vessel and rendered operative by the revolution of said tail shaft for effecting movement of said regulating shaft axially of said tail shaft to effect pitch setting movement of said propeller blade.

4. In combination with a propeller hub assembly having the blades thereof mounted for regulative pivotal adjustment, means for controlling said adjustment, said means comprising a coupling rigid with a hollow driven tail shaft, a worm wheel mounted therein, a worm for said worm wheel, a star wheel projecting in angular relation to the periphery of said coupling and rigidly secured for rotative movement to said worm, means operable by the revolution of said coupling to impart selected of rotary directions to said star wheel, and means axially movable through the bore of said tail shaft and actuated by said worm wheel to impart said pivotal adjustment to the propeller blades.

5. In a regulator for adjusting the pitch of propeller blades, in combination, a propeller hub assembly adapted to be rigidly secured to a hollow tail shaft, propeller blades pivotally mounted therein, a regulating shaft carried within the bore of said tail shaft and having operative connection to said propeller blades whereby axial movement of said regulating shaft will effect pitch setting movement to said propeller blades, and means to effect said axial movement, said means including intermeshing gear teeth, operative connection between one of said gears and the regulating shaft, and means to control relative activity of one gear with respect to the other.

6. A propeller hub assembly adapted to be rigidly secured to the driven tail shaft of a vessel, propeller blades pivotally mounted therein and screw-threaded axially movable means carried interiorly of said tail shaft operatively connected to said propeller blades whereby pitch setting movement can be imparted to said propeller blades, said means being normally revoluble with said tail shaft.

7. The combination with a propeller hub assembly including pivotally mounted blades and means for revolubly driving said blades, of means for adjusting the pitch of said blades about their respective pivotal axes, said adjusting means including a star wheel, and means movable into and out of engaging relation with respect to either of oppositely disposed fingers of said star wheel for selectively controlling the direction of pivotal regulation.

8. In a pitch control mechanism for a propeller assembly, the combination of a tubular power shaft, regulative means projecting through the bore of said power shaft operatively connected to the blades of said propeller, means rotative with said power shaft, and means supported by said rotative means and adapted for relative rotary movement with respect thereto for controlling said regulating means, said control means having a common axis of revolution with that of the power shaft.

9. In pitch control mechanism for a propeller assembly, the combination of a tubular power shaft, regulative means operatively connected to the blades of said propeller projecting through the bore of said power shaft, a coupling rotative with said power shaft, a worm wheel having operative connection with said regulative means journaled therein, a worm tangentially disposed with respect to said wheel and meshing therewith, and means to selectively impart reverse directions of rotations to said worm.

10. The combination with a propeller hub, blades mounted thereto, and a tail shaft for driving the same, of means for regulatively adjusting the pitch to said blades, said means comprising an axially disposed shaft having spider arms integral therewith and connecting rods pivoted to the outer ends of said rods for engaging the same to the respective blades in offset disposition of their axes, said shaft having a screw-threaded portion, a wheel secured against axial displacement for engaging said screw threads, and means for selectively motivating said wheel in reverse directive travels to control the axial disposition of said shaft.

11. In pitch control mechanism for a propeller assembly, the combination with a pair of shafts, sleeved, one with respect to the other and projecting from the interior of the vessel to respectively regulate the pitch and drive the blades of said propeller assembly, and a toothed wheel mounted interiorly of said vessel, said shafts and wheel being adapted to normal conjoint rotative activity, of means to impart axial motivity to said regulating shaft in opposition to said power shaft and the wheel, said means including a gear meshing with said wheel and adapted to have reverse directions of rotation imparted selectively thereto.

12. The combination with a propeller hub, blades pivotally supported thereon, and a tubular tail shaft for driving said hub, of means for adjusting the pitch to said propeller blades, said means comprising a shaft supported interiorly of said tail shaft and revoluble therewith, connection therebetween and the blades, and means for axially motivating said last named shaft comprising screw-threads on said shaft, an internally screw-threaded gear wheel engaging said shaft threads, and means for imparting reverse directions of rotation to said wheel relative to the rotation of the shafts.

Signed at Seattle, Washington, this 10th day of June, 1929.

LEIGH H. COOLIDGE.